United States Patent
Kondapavuluri et al.

(10) Patent No.: US 11,063,921 B2
(45) Date of Patent: Jul. 13, 2021

(54) EXTRACTING DATA FROM PASSIVELY CAPTURED WEB TRAFFIC THAT IS ENCRYPTED IN ACCORDANCE WITH AN ANONYMOUS KEY AGREEMENT PROTOCOL

(71) Applicant: INTERNATIONAL BUSINESS MACHINES CORPORATION, Armonk, NY (US)

(72) Inventors: Eswar Phani Kondapavuluri, Albany, CA (US); Kanwaldeep S. Bindra, Fremont, CA (US); Atul A. Waghmare, Pleasanton, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 227 days.

(21) Appl. No.: 16/182,591

(22) Filed: Nov. 6, 2018

(65) Prior Publication Data
US 2020/0145396 A1 May 7, 2020

(51) Int. Cl.
*H04L 29/06* (2006.01)
*H04W 12/08* (2021.01)
*H04W 12/04* (2021.01)

(52) U.S. Cl.
CPC ........ *H04L 63/061* (2013.01); *H04L 63/0428* (2013.01); *H04L 63/08* (2013.01); *H04W 12/04* (2013.01); *H04W 12/08* (2013.01)

(58) Field of Classification Search
CPC ... H04L 63/061; H04L 63/0428; H04L 63/08; H04L 63/166; H04W 12/08; H04W 12/04; H04W 12/04071
See application file for complete search history.

(56) References Cited

U.S. PATENT DOCUMENTS 8,352,725 B1   1/2013 O'Toole, Jr.
8,615,086 B2  12/2013 Little et al.
(Continued)

FOREIGN PATENT DOCUMENTS

EP   0876027 A2   11/1998

OTHER PUBLICATIONS

Helme, S., "Perfect Forward Secrecy—An Introduction," [online] License CC BY-SA 4.0 (https://creativecommons.org/licenses/by-sa/4.0/)—scotthelme.co.uk, May 10, 2014, retrieved from the Internet: <https://scotthelme.co.uldperfect-forward-secrecy/>.
(Continued)

*Primary Examiner* — Oleg Korsak
*Assistant Examiner* — Feliciano S Mejia
(74) *Attorney, Agent, or Firm* — Cuenot, Forsythe & Kim, LLC (57) ABSTRACT

Encrypted web traffic exchanged between a client device and a web server during a communication session and captured using a passive capture technique can be received. The encrypted web traffic can be encrypted using a shared secret generated for the communication session in accordance with an anonymous key agreement protocol. A TCP connection table, which includes a session identifier for the communication session, can be created for the communication session. At least one TCP connection can be built for the received encrypted web traffic using the TCP connection table. Using the session identifier, the shared secret can be accessed from a cache in which the shared secret is stored, at least temporarily, by the web server. Data from the encrypted web traffic can be extracted by using the shared secret to decrypt the encrypted web traffic. The extracted data can be stored to a data store.

20 Claims, 4 Drawing Sheets

(56) References Cited

U.S. PATENT DOCUMENTS

| | | |
|---|---|---|
| 8,806,189 B2 * | 8/2014 | Kang .................. H04L 63/1466 |
| | | 713/151 |
| 8,837,741 B2 | 9/2014 | Hawkes et al. |
| 9,176,838 B2 * | 11/2015 | Li ........................... G06F 11/30 |
| 9,584,318 B1 * | 2/2017 | Yang ..................... H04L 63/101 |
| 9,893,883 B1 | 2/2018 | Chaubey et al. |
| 9,967,292 B1 | 5/2018 | Higgins et al. |
| 9,998,434 B2 * | 6/2018 | Verzun .................. H04L 9/0662 |
| 10,476,673 B2 * | 11/2019 | Higgins ................ H04L 9/0841 |
| 10,516,532 B2 * | 12/2019 | Taub .................. H04L 63/0442 |
| 10,574,633 B2 * | 2/2020 | Le Saint ............ G06Q 20/3829 |
| 10,637,724 B2 * | 4/2020 | Johnson ................ H04L 67/141 |
| 10,742,611 B2 * | 8/2020 | Naylor .................. H04L 9/0838 |
| 2003/0235206 A1 * | 12/2003 | Heller ................... H04L 47/193 |
| | | 370/467 |
| 2012/0294440 A1 | 11/2012 | Little et al. |
| 2013/0243194 A1 | 9/2013 | Hawkes et al. |
| 2016/0156464 A1 | 6/2016 | Naslund et al. |
| 2018/0062854 A1 | 3/2018 | Kancharla et al. |

OTHER PUBLICATIONS

"Perfect Forward Secrecy," Australian Cyber Security Centre, Australian Government, Feb. 2015, retrieved from the Internet: <https://www.asd.gov.au/publications/protect/Perfect_Forward_Secrecy.pdf>, 2 pg.

Moser, J., "The First Few Milliseconds of an HTTPS Connection," [online] Moserware, Jun. 10, 2009, retrieved from the Internet: <http://www.moserware.com/2009/06/first-few-milliseconds-of-https.html>, 22 pg.

* cited by examiner

302 Receive encrypted web traffic exchanged between a client device and a web server during a communication session and captured using a passive capture technique, the encrypted web traffic being encrypted using a shared secret generated for the communication session in accordance with an anonymous key agreement protocol, wherein the shared secret is unique to the communication session

304 Create a TCP connection table for the communication session and including in the TCP connection table a session identifier for the communication session

306 Build at least one TCP session for the received encrypted web traffic using the TCP connection table

308 Using the session identifier, access the shared secret from a cache in which the shared secret is stored, at least temporarily, by the web server

310 Extract, using a processor, data from the encrypted web traffic via the TCP connection by using the shared secret to decrypt the encrypted web traffic exchanged between the client device and the web server during the communication session

312 Store the extracted data to a data store.

314 Responsive to the communication session being terminated or responsive to determining that decryption of the encrypted web traffic is complete, initiate deletion of the shared secret from the cache

EXTRACTING DATA FROM PASSIVELY CAPTURED WEB TRAFFIC THAT IS ENCRYPTED IN ACCORDANCE WITH AN ANONYMOUS KEY AGREEMENT PROTOCOL

BACKGROUND

The present invention relates to electronic communications, and more specifically, to data processing systems that support Web analytics.

Web analytics is the measurement, analysis and reporting of web data for various purposes. Such purposes can include understanding and optimizing web usage, provide analytical data for business and market research, and assessing and improving the effectiveness of a website. Web analytics applications also can help companies measure results of traditional print or broadcast advertising. For example, Web analytics can be used to estimate how traffic to a website changes after the launch of new advertising and gauge the traffic, as well as to gauge popularity trends. Such Web analytics are useful for market research. Further, Web analytics can include struggle analytics, which analyze conditions of the online customer experience, for example where visitors encounter difficulties when they interact with a business website. Still, there are many other uses for analytical data generated using Web analytics.

SUMMARY

A method includes receiving encrypted web traffic exchanged between a client device and a web server during a communication session and captured using a passive capture technique, the encrypted web traffic being encrypted using a shared secret generated for the communication session in accordance with an anonymous key agreement protocol, wherein the shared secret is unique to the communication session. The method also can include creating a TCP connection table for the communication session and including in the TCP connection table a session identifier for the communication session. The method also can include building at least one TCP connection for the received encrypted web traffic using the TCP connection table. The method also can include, using the session identifier, accessing the shared secret from a cache in which the shared secret is stored, at least temporarily, by the web server. The method also can include extracting, using a processor, data from the encrypted web traffic via the TCP connection by using the shared secret to decrypt the encrypted web traffic exchanged between the client device and the web server during the communication session, and storing the extracted data to a data store.

A system includes a processor programmed to initiate executable operations. The executable operations include receiving encrypted web traffic exchanged between a client device and a web server during a communication session and captured using a passive capture technique, the encrypted web traffic being encrypted using a shared secret generated for the communication session in accordance with an anonymous key agreement protocol, wherein the shared secret is unique to the communication session. The executable operations also can include creating a TCP connection table for the communication session and including in the TCP connection table a session identifier for the communication session. The executable operations also can include building at least one TCP connection for the received encrypted web traffic using the TCP connection table. The executable operations also can include using the session identifier, accessing the shared secret from a cache in which the shared secret is stored, at least temporarily, by the web server. The executable operations also can include extracting data from the encrypted web traffic via the TCP connection by using the shared secret to decrypt the encrypted web traffic exchanged between the client device and the web server during the communication session, and storing the extracted data to a data store.

A computer program product includes a computer readable storage medium having program code stored thereon. The program code is executable by a data processing system to initiate operations. The operations include receiving encrypted web traffic exchanged between a client device and a web server during a communication session and captured using a passive capture technique, the encrypted web traffic being encrypted using a shared secret generated for the communication session in accordance with an anonymous key agreement protocol, wherein the shared secret is unique to the communication session. The operations also can include creating a TCP connection table for the communication session and including in the TCP connection table a session identifier for the communication session. The operations also can include building at least one TCP connection for the received encrypted web traffic using the TCP connection table. The operations also can include using the session identifier, accessing the shared secret from a cache in which the shared secret is stored, at least temporarily, by the web server. The operations also can include extracting data from the encrypted web traffic via the TCP connection by using the shared secret to decrypt the encrypted web traffic exchanged between the client device and the web server during the communication session, and storing the extracted data to a data store.

DETAILED DESCRIPTION

This disclosure relates to data processing systems and, more particularly, to data processing systems that support Web analytics.

In accordance with the inventive arrangements disclosed herein, data communicated between a web server and client devices can be captured and stored for use in performing Web analytics. Since the Security of electronic communications that take place over the Internet is an increasing concern in today's world, oftentimes such data is encrypted using session keys in accordance with a key agreement protocol. Forward secrecy, also known as perfect forward secrecy (PFS), is a feature of certain key agreement protocols. PFS mitigates the risk of the session keys being compromised, even if a private key of a server is compromised. In this regard, PFS is designed to prevent the compromise of a long-term secret key from affecting the confidentiality of past conversations. For example, by generating a unique session key for every session a user initiates, even the compromise of a single session key will not affect any data other than that exchanged in the specific session protected by that particular key. PFS further protects data on the transport layer of a network that uses common SSL/TLS protocols, including OpenSSL.

PFS can be implemented, for example, in accordance with the Transport Layer Security (TLS) protocol using the Elliptic-curve Diffie-Hellman (ECDH) key agreement protocol. ECDH is an anonymous key agreement protocol that allows two parties, each having an elliptic-curve public-private key pair, to establish a shared secret over an insecure channel. This shared secret may be directly used as a key to encrypt subsequent communications using a symmetric-key cipher. ECHD is a variant of the Diffie-Hellman (DH) key exchange protocol that uses elliptic-curve cryptography. Elliptic-curve Diffie-Hellman ephemeral (ECDHE) is a version of ECDH which may be implemented in the arrangements described herein. ECDHE uses ephemeral public keys that are temporary and typically not persisted to bulk storage devices, and thus provides for very secure communications.

Nonetheless, the use of anonymous key agreement protocols for data communications presents challenges to performing Web analytics on the data. The present arrangements overcome such challenges in a manner that maintains the intended level of security, and while not requiring additional software and/or plug-ins to be installed on web servers hosting the communication sessions in which the encrypted data is communicated. Thus, the web servers are not burdened with performing operations that tie up significant processing resources.

Several definitions that apply throughout this document now will be presented.

As defined herein, the term "web traffic" means data communicated over the Internet in a communication session.

As defined herein, the term "encrypted web traffic" means web traffic that is encrypted.

As defined herein, the term "communication session" means a temporary and interactive information interchange between two or more communicating devices, for example between a client device and a server.

As defined herein, the term "session identifier" means an identifier assigned to a communication session that identifies the communication session and is unique to that communication session.

As defined herein, the term "shared secret" means an encryption key used to encrypt and decrypt data.

As defined herein, the term "passive capture technique" means a technique for duplicating data (e.g., web traffic) communicated over a network (e.g., the Internet) that does not involve a server, from which and/or to which the data is communicated, in the process of duplicating the data. In this regard, the server sending or receiving the data over the network does not provide information for use in duplicating the data to the system or device performing a passive capture technique. Instead, the data is merely routed through such system or device, and the system or device autonomously duplicates the data. Once duplicated, however, the data can be communicated to another server.

As defined herein, the term "cache" means a storage system or device configured to temporarily store data.

As defined herein, the term data store means a storage location in a bulk storage device or system where data is stored.

As defined herein, the term "responsive to" means responding or reacting readily to an action or event. Thus, if a second action is performed "responsive to" a first action, there is a causal relationship between an occurrence of the first action and an occurrence of the second action, and the term "responsive to" indicates such causal relationship.

As defined herein, the term "computer readable storage medium" means a storage medium that contains or stores program code for use by or in connection with an instruction execution system, apparatus, or device. As defined herein, a "computer readable storage medium" is not a transitory, propagating signal per se.

As defined herein, the term "server" means a data processing system configured to share services with one or more other data processing systems.

As defined herein, the term "data processing system" means one or more hardware systems configured to process data, each hardware system including at least one processor programmed to initiate executable operations and memory.

As defined herein, the term "processor" means at least one hardware circuit (e.g., an integrated circuit) configured to carry out instructions contained in program code. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, the term "client device" means a data processing system that requests shared services from a server, and with which a user directly interacts. Examples of a client device include, but are not limited to, a workstation, a desktop computer, a computer terminal, a mobile computer, a laptop computer, a netbook computer, a tablet computer, a smart phone, a personal digital assistant, a smart watch, smart glasses, a gaming device, a set-top box, a smart television and the like. Network infrastructure, such as routers, firewalls, switches, access points and the like, are not client devices as the term "client device" is defined herein.

As defined herein, the term "real time" means a level of processing responsiveness that a user or system senses as sufficiently immediate for a particular process or determination to be made, or that enables the processor to keep up with some external process.

As defined herein, the term "automatically" means without user intervention.

As defined herein, the term "user" means a person (i.e., a human being).

Figure 1:
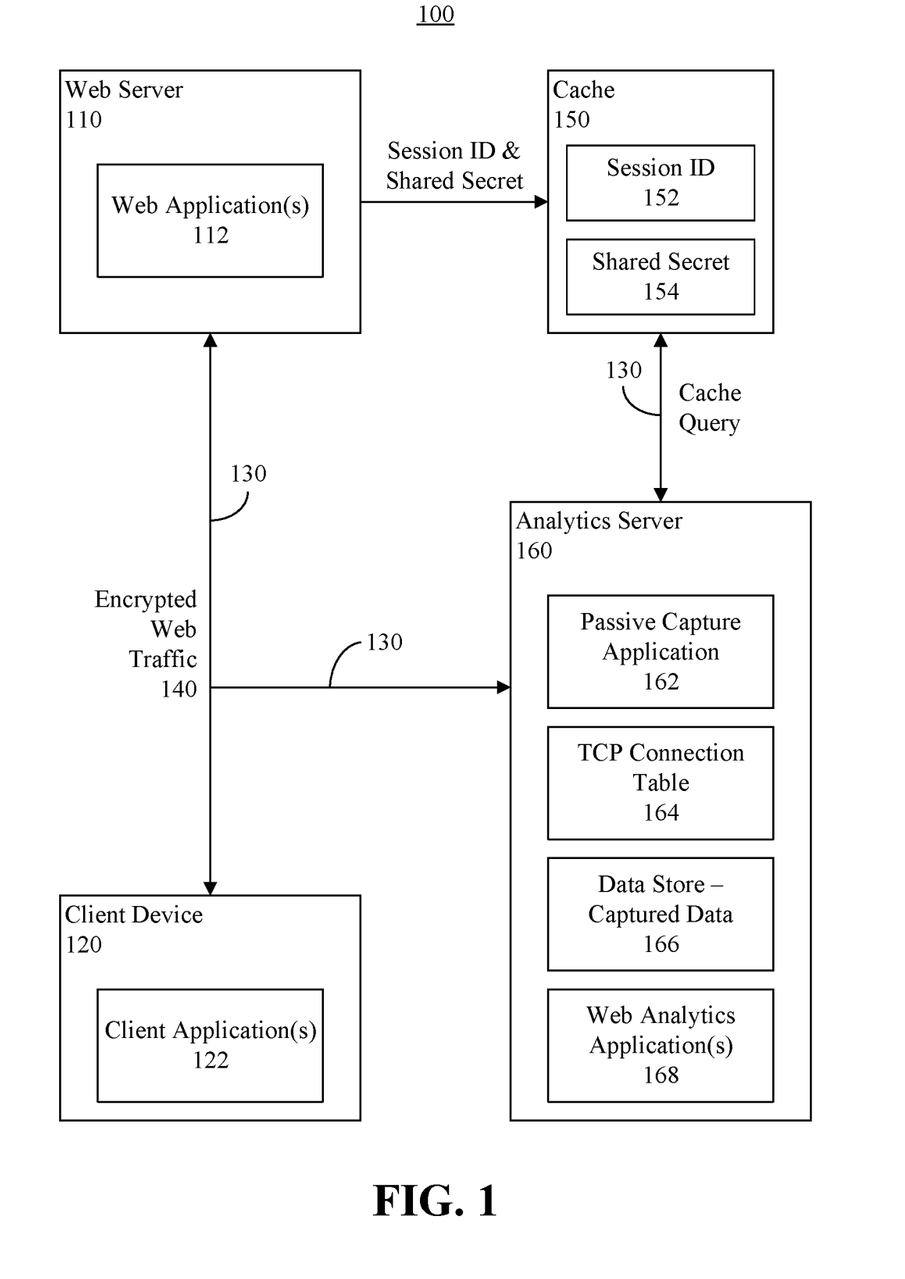
FIG. 1 is a block diagram illustrating an example of a network computing environment.

FIG. 1 is a block diagram illustrating an example of a computing environment 100. The computing environment 100 can include a web server 110 executing at least one web application 112 and at least one client device 120 executing at least one client application 122. The client application 122 can be, for example, a web browser or mobile application configured to interface with applications/services provided by the web server 110, such as the web application 112. The web server 110 and the client device 120 can be communicatively linked via at least one communication network 130. The communication network 130 is the medium used to provide communications links between various devices and data processing systems connected together within the computing environment 100. The communication network 130 may include connections, such as wire, wireless communication links, or fiber optic cables. The communication network 130 can be implemented as, or include, any of a variety of different communication technologies such as a wide area network (WAN), a local area network (LAN), a wireless network, a mobile network, a Virtual Private Network (VPN), the Internet, the Public Switched Telephone Network (PSTN), or similar technologies.

In operation, the client device 120 can establish a communication session with the web server 110 via the communication network 130. The communication session can be encrypted in accordance with the Transport Layer Security (TLS) protocol, which can operate over a transmission control protocol (TCP) connection. For example, the communication session can be encrypted using PFS implemented in accordance with the TLS protocol using the ECDH key agreement protocol, for example ECDHE.

In illustration, during initial Secure Sockets Layer (SSL) negotiation (e.g., initial handshake) between the client device 120 and the web server 110 to establish the communication session, the web server 110 can generate a session identifier (session ID) for the communication session. Further, the web server 110 and the client device 120 can generate a new set of Diffie-Hellman parameters used for encryption during the communication session. By way of example, the client device 120 can randomly choose two prime numbers, p and g, and communicate the prime numbers p and g to the web server 120. Further, the client device 120 can randomly choose a secret integer a (i.e., a private key for the client device 120), and communicate to the web server 110 a value A, where $A=g^a \mod p$. The web server 120 can randomly choose a secret integer b (i.e., a private key for the web server 110), and communicate to the client device a value B, where $B=g^b \mod p$. The client device 110 can calculate the shared secret s as follows: $s=B^a \mod p$. The web server 110 can calculate the shared secret s as follows: $s=A^b \mod p$. Notably, $B^a \mod p = A^b \mod p$, and thus both the web server 110 and the client device 120 both have the same shared secret for use as an encryption key in encrypting/decrypting web traffic 140 exchanged between the web server 110 and the client device 120 (e.g., between the web application 112 and the client application 122). Moreover, since the prime numbers p and g, the integer a and the integer b are randomly selected for the communication session, the shared secret s is unique to that communication session. In an aspect, the web server 110 and client device 120 can use other public/private keys for encrypted communications during the initial SSL negotiation, though the present arrangements are not limited in this regard.

The web server 110 can store the shared secret locally and use the shared secret to create a TLS connection between the web server 110 (e.g., the web application 112) and the client device 120 (e.g., the client application 122). Further, the web server 110 can store to a cache 150, at least temporarily, the session ID 152 and the shared secret 154 in a manner that creates an association between the session ID and the shared secret. For example, the session ID 152 and the shared secret 154 can be stored in the same record of a table. The cache 150 can be, for example, a data storage system (or a data storage device) that is communicatively linked to the web server 110. For example, the storage system can include at least one data table and software (e.g., a database application) configured to perform data storage to the data table, data access from the data table, and deletion of data from the data table in response to queries and/or other commands. The storage system also can be configured to support TSL connections, for example using an anonymous key agreement protocol such as the ECDHE protocol. Further, the web server 110 can be configured to connect to the cache 150 using such TSL connections. Thus, communication of the session ID 152 and shared secret 154 to the cache 150 can remain secure. The web server 110 can delete the session ID 152 and the shared secret 154 from the cache 150 responsive to the communication session being terminated.

The computing environment 100 further can include an analytics server 160 configured to passively analyze traffic data exchanged with the web application 112. As noted, the web traffic 140 exchanged between the web application 112 and the client application 122 is encrypted. This presents a challenge to implementing passive data analytics. The arrangements described herein, however, present a novel solution for overcoming such challenge, while not requiring changes to, or plug-ins for, the web application(s) 112, and while not requiring additional software executing on the web server 110. In this regard, the arrangements described herein provide a process for passively analyzing the web traffic 140 exchanged between the web application 112 and the client application 122 without initiating additional processes and/or workloads on the web server. Instead, the web server 110 need only once store the session ID 152 and shared secret 154 to the cache 150. Thus, in contrast to prior web analytics processes, efficiency of the web server 110 while hosting communication sessions that are analyzed using web analytics is improved.

The analytics server 160 can include the passive capture application 162 configured to passively capture the encrypted web traffic 140, as well as encrypted traffic between the web application(s) 112 and other client devices. For example, at a hardware level, the passive capture application 162 can passively receive the encrypted web traffic 140 using port mirroring or a network tap. A network tap, which is known in the art, is a fully passive monitoring device that mirrors traffic that passes between network nodes. For example, a network tap can be implemented as a network switch, through which the encrypted web traffic 140 is routed, that copies packets of the encrypted web traffic 140 onto designated tap ports. Port mirroring, which also is known in the art, duplicates data packets in the network traffic. Port mirroring, for example, also can be implemented by a network switch in the communication network 130 through which the encrypted web traffic 140 is routed. In another arrangement, at a software level, the encrypted web traffic 140 can be duplicated to the passive capture application 162, for example using a network protocol analyzer. Network protocol analyzers are known in the art.

As noted, a network tap operates passively. Moreover, use of a network tap does not involve the web server 110 or the analytics server 160 in the process of duplicating the encrypted web traffic 140. Accordingly, use of a network tap to duplicate the encrypted web traffic 140 is a passive data capture technique. Even though port mirroring and a network protocol analyzer may actively duplicate the encrypted web traffic 140, the duplication of the encrypted web traffic 140 using port mirroring or a network protocol analyzer also does not involve the web server 110 or the analytics server 160. Accordingly, use of port mirroring or a network protocol analyzer to duplicate the encrypted web traffic also is a passive capture technique. Use of port mirroring or a network protocol analyzer, however, may add an insignificant amount of latency (e.g., less than 100 microseconds and, in some cases, less than 10 microseconds) to communication of the encrypted web traffic 140 between the web server 110 and the client device 120.

Responsive to detecting the encrypted web traffic 140, the passive capture application 162 can create a connection key unique to that communication session. The passive capture application 162 can determine whether a TCP connection table 164 for the connection key has already created. If not, the passive capture application 162 can create the connection table using the connection key and create a connection key/value pair in the TCP connection table 164.

Figure 2:
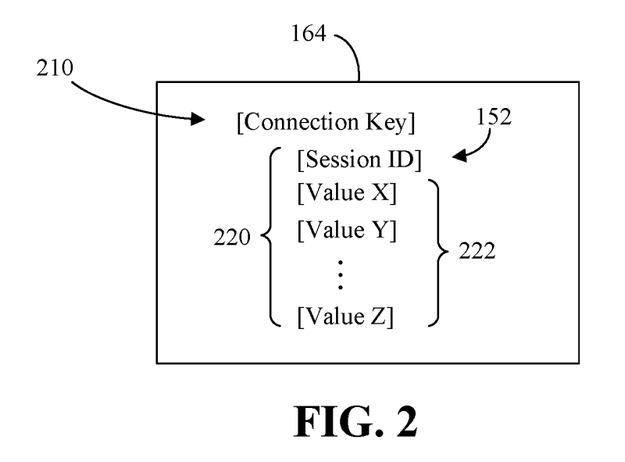
FIG. 2 depicts an example of a connection table.

FIG. 2 depicts an example of the TCP connection table 164, which can include the unique connection key 210 for the present communication session. To create the unique connection key 210, the passive capture application 162 can identify, for example in one or more packet headers of the encrypted web traffic 140, the internet protocol (IP) address of the web server 110, the port number of the web server 110 being used for the communication session, the IP address of the client device 120, and the port number of the client device 120 being used for the communication session. The passive capture application 162 can hash those values into a connection string and create the TCP connection table 164 to include the connection string as a unique connection key 210 for the communication session. Under the unique connection key 210 in the TCP connection table 164, the passive capture application 162 can store the various values 220, which the passive capture application 162 also can identify from one or more packet headers of the encrypted web traffic 140. Together, the unique connection key 210 and the values 220 can form a connection key/value pair. The values 220 can include the session ID 152 and various other values 222 pertinent to the communication session identified by the passive capture application 162. Examples of other values 222 include, but are not limited to, a value that indicates the direction packets are being communicated, for example from a responder (e.g., the web server 110) to an initiator (e.g., the client device 120), or from the initiator to the responder. The other values 222 further can include TCP sequence numbers, which can be used to handle packets that are received out of sequence.

Referring to FIGS. 1 and 2, for each data packet of the captured web traffic 140 the passive capture application 162 receives, the passive capture application 162 can hash, in real time, the IP addresses and port numbers contained in that data packet to generate a connection string. The passive capture application 162 can identify the TCP connection table 164 having the unique connection key 210 that matches the connection string and access the values 220 in the corresponding connection key/value pair, including the session ID 152. Further, the passive capture application can generate, in real time, a query indicating the session ID 152 and use the query to access the shared secret 154 from the cache 150. In this regard, the analytics server 160 can establish a secure connection (e.g., a TSL connection using an anonymous key agreement protocol such as ECDHE protocol) to the cache 150 and communicate the query to the cache 150 over the secure connection. In illustration, the passive capture application 162 can use the TCP connection table 164 to build a TCP connection for the received encrypted web traffic 140, without any participation by the web server 110 in establishing the TCP connection. For example, the passive capture application 162 also can use the TCP connection table 164 to separate out TCP packets from web traffic, including the encrypted web traffic 140, into respective TCP connections. Further, the passive capture application 162 can use the TCP connection table 164 to maintain TCP connection states of the TCP connections. Each TCP connection can include the session ID 152 used to query the cache 150 to access the shared secret 154.

In response to the query, the cache 150 can provide the shared secret 154 to the cache passive capture application 162 over the secure connection. The passive capture application 162 can receive the shared secret 154 from the cache 150 in real time. Because the shared secret 154 is accessed using a secure connection, the communication of the shared secret 154 from the cache 150 to the passive capture application 162 can remain secure.

Moreover, during operation the web server 110 may establish a large number of secure communication sessions using an anonymous key agreement protocol, each of which has a unique shared secret. Because the web server 110 stores the shared secrets in the cache 150 from which the analytics server 160 can access the shared secrets, the web server 110 need not be tasked with responding to queries from the analytics server 160 requesting the various shared secrets for each of the communication sessions. Instead, the web server 110 need only once store the shared secret 154 to the cache 150 in response to the communication being established. This can significantly improve performance of the web server 110 in comparison to a process in which the web server 110 would be queried for shared secrets each time the analytics server 160 decrypts data packets. Moreover, because the analytics server 160 does not persist the shared secrets locally, the risk of the shared secrets being discovered by unscrupulous means is mitigated, thus ensuring a high level of data security.

Responsive to receiving the shared secret 154 from the cache 150, the passive capture application 162 can, via the TCP connection, extract data from the encrypted web traffic 140 by decrypting, in real time, the received data packet using the shared secret 154. Responsive to extracting the data, the passive capture application 162 can store, in real time, the extracted data to a data store 166 configured to store captured data. Optionally, the passive capture application 162 can include in the data store 166, with the decrypted data, the session ID 152 for the communication session in which the data was communicated, which may be useful for further analysis.

The web server 110 can be configured to delete the shared secret 154 and, optionally, the session ID 152 from the cache 150 responsive to detecting an end of the communication session, this need not be the case. In another arrangement, the passive capture application 162 can communicate a delete command to the cache 150 to delete the shared secret 154 and, optionally, the session ID 152 from the cache 150. By way of example, the passive capture application 162 can monitor the communication session and, in response to detecting an end of the communication session, communicate the delete command to the cache 150. In another example, responsive to the passive capture application 162 determining that decryption of the encrypted web traffic 140 is complete, the passive capture application 162 can communicate the delete command to the cache 150. The delete command can indicate the session ID 152 for the communication session. In response to receiving the delete command, the cache 150 can delete the shared secret 154 and, optionally, the session ID 152 from the cache 150. Such arrangements provide the passive capture application 162 the ability to process the encrypted web traffic 140 at its own pace. In a further arrangement, the cache 150 itself can be conjured to delete at least the shared secret 154 and, optionally, the session ID 152 from the cache 150, for example responsive to a threshold period of time that the communication session is open being reached and/or responsive to a threshold period of time since the shared secret 154 was last accessed being reached (e.g., using Least Recently Used (LRU) process that discards least recently used items). In any case, the shared secret 154 and, optionally, the session ID 152, can be stored in the cache 150 for a limited period of time. The arrangements in which the passive capture application 162 and/or cache 150 initiate the deletion of the shared secret 154/session ID 152 can further reduce the burden on the web server 110, thus further improving the efficiency of the web server 110 while hosting communication sessions that are analyzed using web analytics.

The analytics server 160 further can include one or more web analytics application(s) 168 configured to perform Web analytics on the captured data stored in the data store 166 and generate corresponding analytical data. As noted, Web analytics is the measurement, analysis and reporting of web data for various purposes. Such purposes can include understanding and optimizing web usage, provide analytical data for business and market research, and assessing and improving the effectiveness of a website. Web analytics applications also can help companies measure results of traditional print or broadcast advertising. For example, Web analytics can be used to estimate how traffic to a website changes after the launch of new advertising. Web analytics also can be used to gauge traffic and popularity trends, which is useful for market research. Still, there are many other uses for analytical data generated using Web analytics, and the present arrangements are not limited in this regard. Notably, the analytics server 160 can decrypt and store packet data received for multiple communication sessions as the encrypted packets are received in accordance with the processes described herein. Accordingly, the analytical data generated by the Web Analytics application(s) 168 can be far reaching and encompassing.

As noted, the amount of data used in Web analytics can be very large. In comparison to other web analytics processes, the present arrangements eliminate the need for processes in which the web server 110 directly communicates the data from communication sessions to the analytics server 160, which would tie up valuable processing resources on the web server 110. Thus, in comparison to processes commonly used to implement Web analytics, those processing resources that otherwise would be used for data communication to the analytics server 160 can be allocated for web hosting. This significantly improves the efficiency of the web server 110 at performing such task and allows the web server to handle a greater number of communication sessions with reduced latency.

Figure 3:
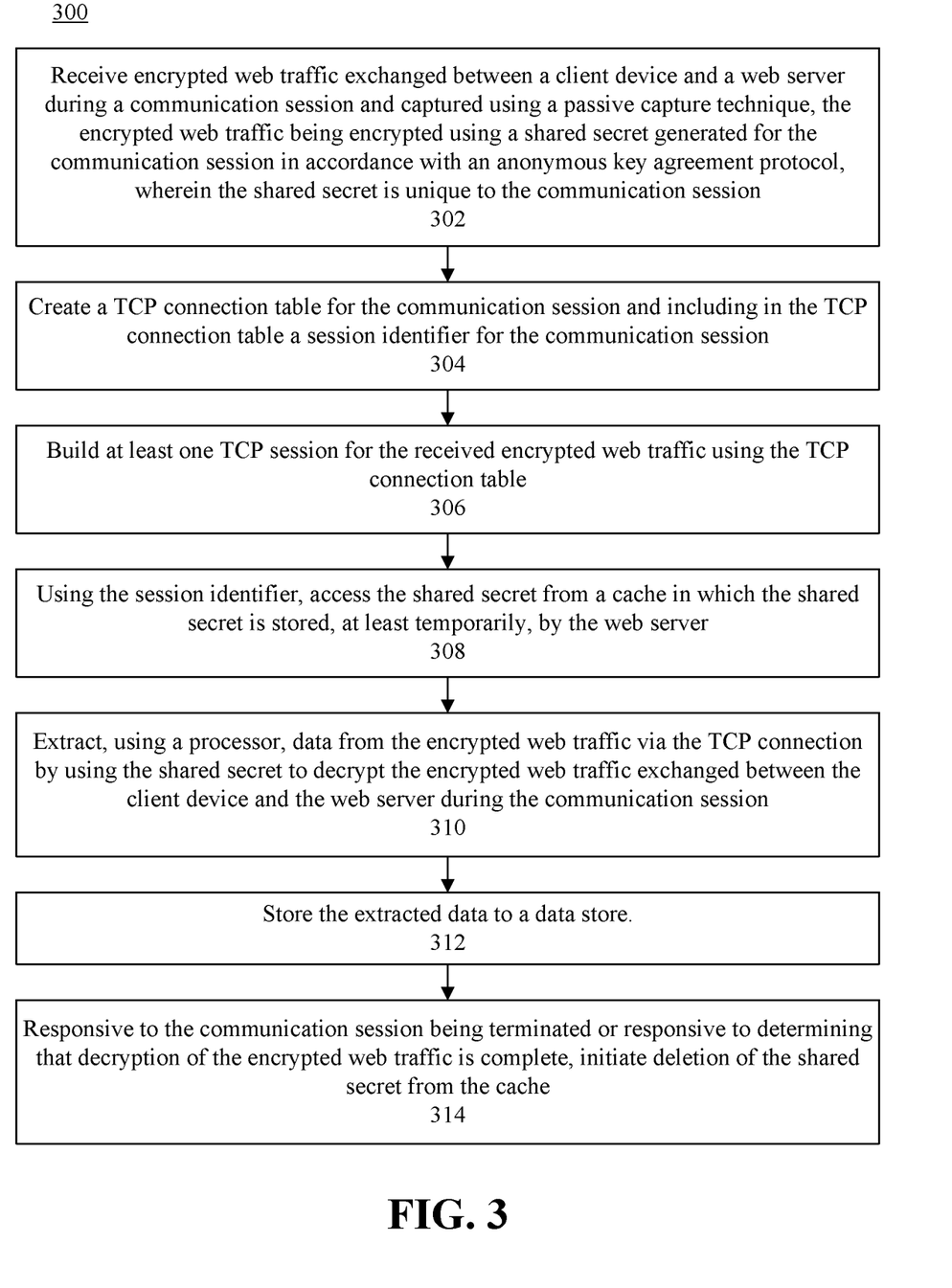
FIG. 3 is a flowchart illustrating an example of a method of extracting data from encrypted web traffic.

FIG. 3 is a flowchart illustrating an example of a method 300 of extracting data from encrypted web traffic. The method 300 can be implemented by the analytics server 160 of FIG. 1, or another suitable data processing system.

At step 302, the analytics server 160 can Receive encrypted web traffic exchanged between a client device and a web server during a communication session and captured using a passive capture technique, the encrypted web traffic being encrypted using a shared secret generated for the communication session in accordance with an anonymous key agreement protocol, wherein the shared secret is unique to the communication session. At step 304, the analytics server 160 can create a TCP connection table for the communication session and include in the TCP connection table a session identifier for the communication session. At step 306, the analytics server 160 can build at least one TCP connection for the received encrypted web traffic using the TCP connection table. At step 308, using the session identifier, the analytics server 160 access the shared secret from a cache in which the shared secret is stored, at least temporarily, by the web server. At step 310, the analytics server 160 can extract, using a processor, data from the encrypted web traffic via the TCP connection by using the shared secret to decrypt the encrypted web traffic exchanged between the client device and the web server during the communication session. At step 312, the analytics server 160 can store the extracted data to a data store. At step 314, responsive to the communication session being terminated or responsive to determining that decryption of the encrypted web traffic is complete, the analytics server 160 can initiate deletion of the shared secret from the cache.

Figure 4:
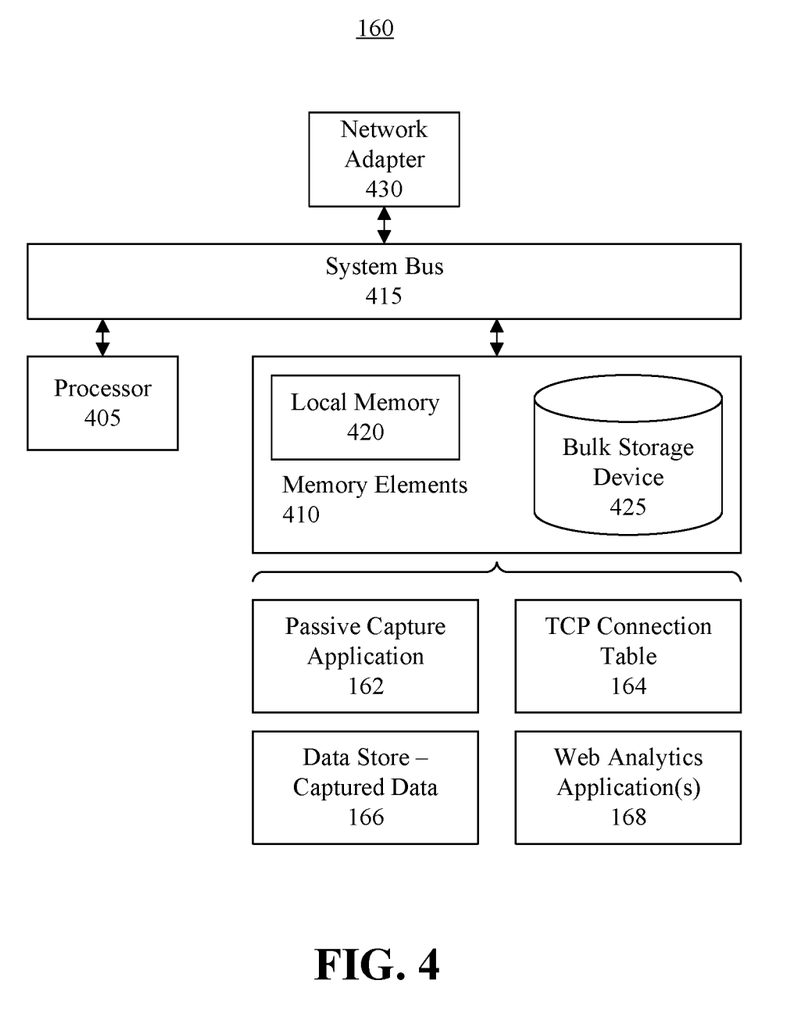
FIG. 4 is a block diagram illustrating example architecture for an analytics server.

FIG. 4 is a block diagram illustrating example architecture for the analytics server 160. The analytics server 160 can include at least one processor 405 (e.g., a central processing unit) coupled to memory elements 410 through a system bus 415 or other suitable circuitry. As such, the analytics server 160 can store program code within the memory elements 410. The processor 405 can execute the program code accessed from the memory elements 410 via the system bus 415. It should be appreciated that the analytics server 160 can be implemented in the form of any system including a processor and memory that is capable of performing the functions and/or operations described within this specification. For example, the analytics server 160 can be implemented as a server or a plurality of communicatively linked servers.

The memory elements 410 can include one or more physical memory devices such as, for example, local memory 420 and one or more bulk storage devices 425. Local memory 420 refers to random access memory (RAM) or other non-persistent memory device(s) generally used during actual execution of the program code. The bulk storage device(s) 425 can be implemented as a hard disk drive (HDD), solid state drive (SSD), or other persistent data storage device. The analytics server 160 also can include one or more cache memories (not shown) that provide temporary storage of at least some program code in order to reduce the number of times program code must be retrieved from the bulk storage device 425 during execution.

One or more network adapters 430 can be coupled to analytics server 160 to enable the analytics server 160 to become coupled to other systems, computer systems, remote printers, and/or remote storage devices through intervening private or public networks. Modems, cable modems, transceivers, and Ethernet cards are examples of different types of network adapters 430 that can be used with the analytics server 160.

As pictured in FIG. 4, the memory elements 410 can store the components of the analytics server 160, namely the passive capture application 162, the TCP connection table 164, the data store 166 and the web analytics application(s) 168. Being implemented in the form of executable program code, the passive capture application 162 and web analytics application(s) can be executed by the analytics server 160 and, as such, can be considered part of the analytics server 160. The TCP connection table 164 and data store 166 also can be can be considered part of the analytics server 160. Moreover, the passive capture application 162, TCP connection table 164, data store 166 and web analytics application(s) 168 are functional data structures that impart functionality when employed as part of the analytics server 160.

While the disclosure concludes with claims defining novel features, it is believed that the various features described herein will be better understood from a consideration of the description in conjunction with the drawings. The process (es), machine(s), manufacture(s) and any variations thereof described within this disclosure are provided for purposes of illustration. Any specific structural and functional details described are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart(s) and block diagram(s) in the Figures illustrate the architecture, functionality, and operation of possible implementations of systems, methods, and computer program products according to various embodiments of the present invention. In this regard, each block in the flowchart(s) or block diagram(s) may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this disclosure, specify the presence of stated features, integers, steps, operations, elements, and/or components, but do not preclude the presence or addition of one or more other features, integers, steps, operations, elements, components, and/or groups thereof.

Reference throughout this disclosure to "one embodiment," "an embodiment," "one arrangement," "an arrangement," "one aspect," "an aspect," or similar language means that a particular feature, structure, or characteristic described in connection with the embodiment is included in at least one embodiment described within this disclosure. Thus, appearances of the phrases "one embodiment," "an embodiment," "one arrangement," "an arrangement," "one aspect," "an aspect," and similar language throughout this disclosure may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
   receiving encrypted web traffic exchanged between a client device and a web server during a communication session and captured using a passive capture technique, the encrypted web traffic being encrypted using a shared secret generated for the communication session in accordance with an anonymous key agreement protocol, wherein the shared secret is unique to the communication session;
   creating a TCP connection table for the communication session and including in the TCP connection table a session identifier for the communication session;
   building at least one TCP connection for the received encrypted web traffic using the TCP connection table;
   using the session identifier, accessing the shared secret from a cache in which the shared secret is stored, at least temporarily, by the web server;
   extracting, using a processor, data from the encrypted web traffic via the TCP connection by using the shared secret to decrypt the encrypted web traffic exchanged between the client device and the web server during the communication session; and
   storing the extracted data to a data store.

2. The method of claim 1, wherein the anonymous key agreement protocol is an Elliptic-curve Diffie-Hellman ephemeral (ECDHE) protocol.

3. The method of claim 1, wherein the TCP connection table is used to separate out TCP packets from the received encrypted web traffic into respective TCP connections and maintain connection states of the TCP connections.

4. The method of claim 1, wherein the session identifier used to access the shared secret from the cache is accessed from the TCP connection table.

5. The method of claim 1, further comprising:
   establishing a secure connection to the cache using the anonymous key agreement protocol;
   wherein accessing the shared secret from the cache comprises querying the cache over the secure connection.

6. The method of claim 1, wherein the web server establishes a secure connection to the cache using the anonymous key agreement protocol and communicates the shared secret to the cache over the secure connection.

7. The method of claim 1, further comprising:
   responsive to the communication session being terminated or responsive to determining that decryption of the encrypted web traffic is complete, initiating deletion of the shared secret from the cache.

8. A system, comprising:
   a processor programmed to initiate executable operations comprising:
   receiving encrypted web traffic exchanged between a client device and a web server during a communication session and captured using a passive capture technique, the encrypted web traffic being encrypted using a shared secret generated for the communication session in accordance with an anonymous key agreement protocol, wherein the shared secret is unique to the communication session;
   creating a TCP connection table for the communication session and including in the TCP connection table a session identifier for the communication session;
   building at least one TCP connection for the received encrypted web traffic using the TCP connection table;
   using the session identifier, accessing the shared secret from a cache in which the shared secret is stored, at least temporarily, by the web server;
   extracting data from the encrypted web traffic via the TCP connection by using the shared secret to decrypt the encrypted web traffic exchanged between the client device and the web server during the communication session; and
   storing the extracted data to a data store.

9. The system of claim 8, wherein the anonymous key agreement protocol is an Elliptic-curve Diffie-Hellman ephemeral (ECDHE) protocol.

10. The system of claim 8, wherein the TCP connection table is used to separate out TCP packets from the received encrypted web traffic into respective TCP connections and maintain connection states of the TCP connections.

11. The system of claim 8, wherein the session identifier used to access the shared secret from the cache is accessed from the TCP connection table.

12. The system of claim 8, the executable operations further comprising:
    establishing a secure connection to the cache using the anonymous key agreement protocol;
    wherein accessing the shared secret from the cache comprises querying the cache over the secure connection.

13. The system of claim 8, wherein the web server establishes a secure connection to the cache using the anonymous key agreement protocol and communicates the shared secret to the cache over the secure connection.

14. The system of claim 8, the executable operations further comprising:
    responsive to the communication session being terminated or responsive to determining that decryption of the encrypted web traffic is complete, initiating deletion of the shared secret from the cache.

15. A computer program product, comprising:
    a computer readable storage medium having program code stored thereon, the program code executable by a data processing system to initiate operations including:
    receiving encrypted web traffic exchanged between a client device and a web server during a communication session and captured using a passive capture technique, the encrypted web traffic being encrypted using a shared secret generated for the communication session in accordance with an anonymous key agreement protocol, wherein the shared secret is unique to the communication session;
    creating a TCP connection table for the communication session and including in the TCP connection table a session identifier for the communication session;
    building at least one TCP connection for the received encrypted web traffic using the TCP connection table;
    using the session identifier, accessing the shared secret from a cache in which the shared secret is stored, at least temporarily, by the web server;
    extracting data from the encrypted web traffic via the TCP connection by using the shared secret to decrypt the encrypted web traffic exchanged between the client device and the web server during the communication session; and
    storing the extracted data to a data store.

16. The computer program product of claim 15, wherein the anonymous key agreement protocol is an Elliptic-curve Diffie-Hellman ephemeral (ECDHE) protocol.

17. The computer program product of claim 15, wherein the TCP connection table is used to separate out TCP packets from the received encrypted web traffic into respective TCP connections and maintain connection states of the TCP connections.

18. The computer program product of claim 15, wherein the session identifier used to access the shared secret from the cache is accessed from the TCP connection table.

19. The computer program product of claim 15, wherein the program code is executable by the data processing system to initiate operations further comprising:
    establishing a secure connection to the cache using the anonymous key agreement protocol;
    wherein accessing the shared secret from the cache comprises querying the cache over the secure connection.

20. The computer program product of claim 15, wherein the web server establishes a secure connection to the cache using the anonymous key agreement protocol and communicates the shared secret to the cache over the secure connection.

* * * * *